UNITED STATES PATENT OFFICE.

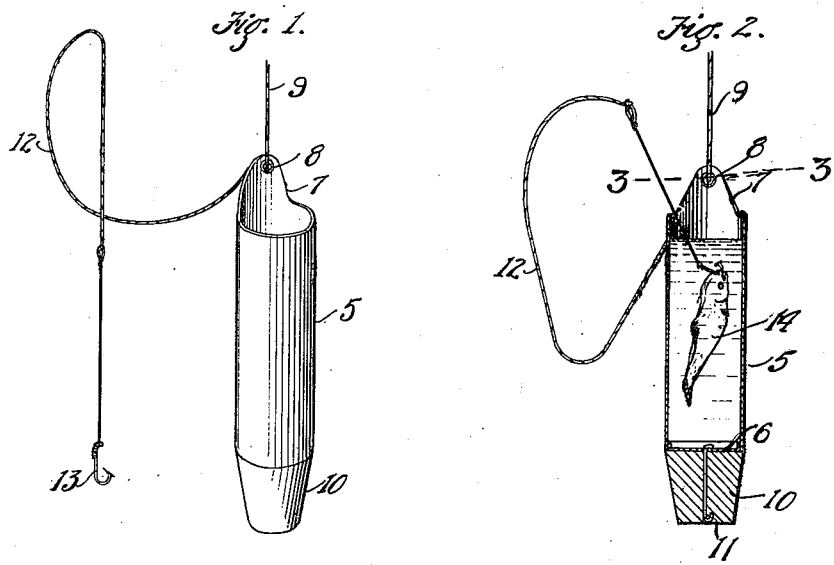
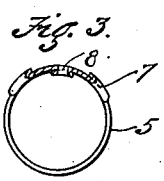
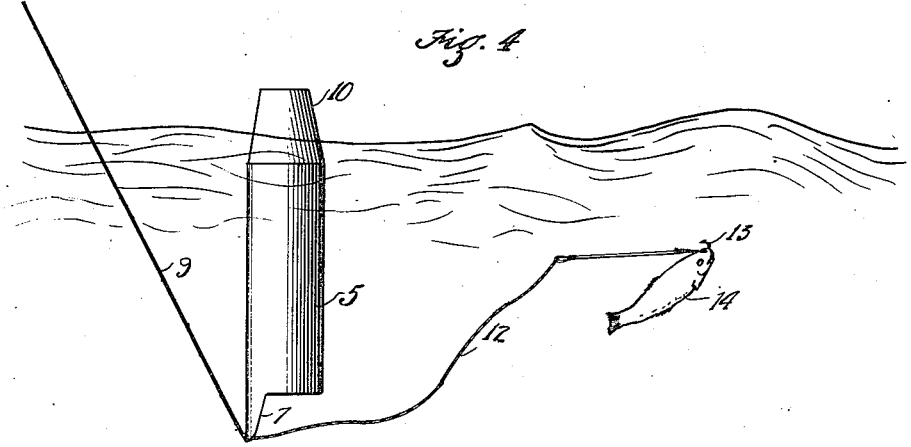

CLAYTON L. WHITE, OF LOS ANGELES, CALIFORNIA.

LIVE-BAIT-CASTING DEVICE.

1,128,205.  Specification of Letters Patent.  Patented Feb. 9, 1915.

Application filed March 3, 1914. Serial No. 822,142.

*To all whom it may concern:*

Be it known that I, CLAYTON L. WHITE, a citizen of the United States, residing at Los Angeles, in the county of Los Angeles, State of California, have invented new and useful Improvements in Live-Bait-Casting Devices, of which the following is a specification.

This invention relates to a live bait casting device.

In casting live bait by the methods now commonly practised, in which heavy weights are employed in order to enable the bait to be cast a considerable distance, the bait is caused to strike the surface of the water with such force that it is usually stunned and sometimes killed, thereby rendering it ineffective in catching game fish. Furthermore, the heavy weight acts to drag the bait downward to a considerable depth where it is further ineffectual in the catching of game fish for the reason that such fish ordinarily feed close to the surface, thus necessitating the frequent recasting of the bait and renewal thereof.

It is the object of this invention to provide a device by which the above objectionable features are obviated, and whereby the live bait may be cast to a considerable distance without danger of injury thereto, and by which it will be maintained near the surface of a body of water in the zone inhabited by game fish when feeding.

A further object is to provide a bait casting device which will serve as a container for water and for the live bait on the hook when being transported from place to place previously to casting, and by which the bait can be maintained alive.

The invention primarily resides in a tube closed at one end to form a liquid container and open at its opposite end, with means at its open end for attachment to a line, and float means attached to the closed end of the tube.

The invention is illustrated in the accompanying drawing, in which:

Figure 1 is a perspective view thereof, Fig. 2 is a vertical section showing the manner of inclosing the live bait and a quantity of water within the device preparatory to casting. Fig. 3 is a detail cross section on the line 3—3 of Fig. 2. Fig. 4 is a view illustrating the operation of the device to liberate the bait and maintain it within a zone adjacent the surface of the body of water into which it is cast.

In the embodiment of the invention as illustrated in the drawings, 5 indicates a tube formed of light material, preferably of aluminum, which tube is closed at its lower end by means of a bottom plate 6, and is open at its upper end to permit the insertion and removal of the live bait and a quantity of water. The upper end of the tube 5 is formed with an extension 7 having a perforation 8 therein by which the tube can be attached to a line 9 at any suitable point on the latter.

As a means for floating the tube and for causing it to assume an inverted position when cast into a stream or the like, a float 10 is securely attached to the lower end or bottom plate 6 of the tube by means of a wire 11 or in any other suitable manner. The float 10 is preferably formed of cork of sufficient size to prevent the tube 5 from sinking so that the device will answer the purpose of a bobber when cast.

In the application of the invention, the tube 5 is attached to the line 9 by engaging the latter with the extension 7 through the perforation 8; the end portion of the line 9 indicated at 12 being continued beyond the connection with the device, a distance according to the desired run of the bait and is fitted at its outer end with the usual hook 13.

In the operation of the invention, the live bait, indicated at 14, is attached to the hook in the usual manner and deposited within the tube 5 in which a quantity of water is placed so as to maintain the bait in its natural element. The device, when thus charged with the bait and the water, is in readiness for casting, which is accomplished in the usual manner; the water within the tube serving to add the necessary weight to the device to facilitate its being cast for a considerable distance. The device on being cast will travel with the closed end foremost by reason of a slight pull on the line 9 on the open end thereof so that when the device strikes the surface the impact will be on the closed end thereof.

Ordinarily a part of the water in the tube will be discharged therefrom during its transit through the air so that the weight of the device will be materially decreased by the time it strikes the water so that the force of the impact of the device with the surface of the stream will be considerably decreased and the distance of submersion of the device below the surface of the water will be correspondingly slight.

The moment that the momentum of the device is overcome in the water the float 10 will operate to invert the tube 5 and bring the latter to the surface and at the same time liberate the live bait, the movements of which will be confined to a distance within the range of the length of the portion 12 of the line.

In casting live bait by the use of this device the bait is protected against impact with the surface of the stream so that it will be alive and active when liberated from the tube 5 and by reason of being confined to a zone adjacent the surface of the stream will serve as an effective bait for game fish which habitually feed near the surface and rise beneath the bait when attacking same.

What I claim is:

1. A bait casting device, comprising a tube closed at one end, means for attaching said tube to a line, and float means attached to the closed end of the tube.

2. A bait casting device, comprising a tube closed at one end to form a receptacle for water and the live bait, an extension on the open end of said tube formed with a perforation to receive a line and a float member attached to the closed end of the tube by which the latter will be caused to be inverted when cast in a stream to release the live bait.

3. A bait casting device comprising a container for live bait, and means for automatically releasing the bait therefrom when the device is submerged in water.

In witness that I claim the foregoing I have hereunto subscribed my name this 16th day of February, 1914.

CLAYTON L. WHITE.

Witnesses:
  EDMUND A. STRAUSE,
  MARIE BATTEY.